Nov. 15, 1938.                    E. REANEY                    2,136,953
                            FACE MILLING CUTTER
                            Filed June 11, 1937
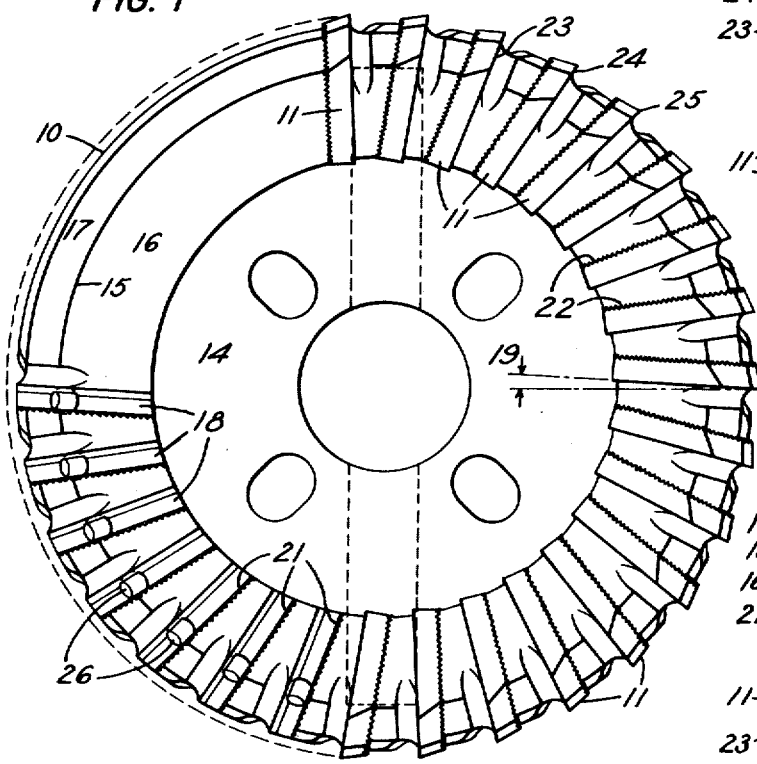
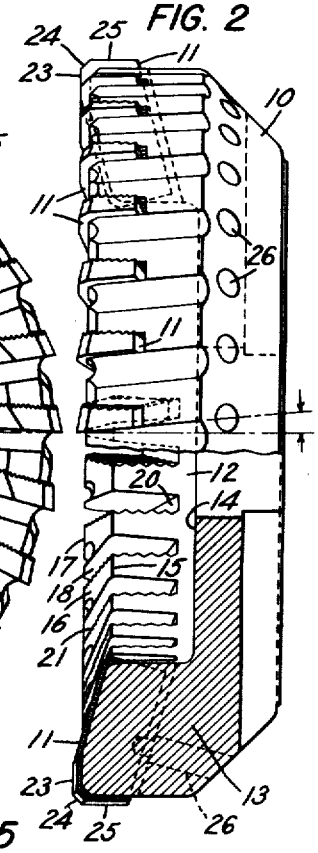
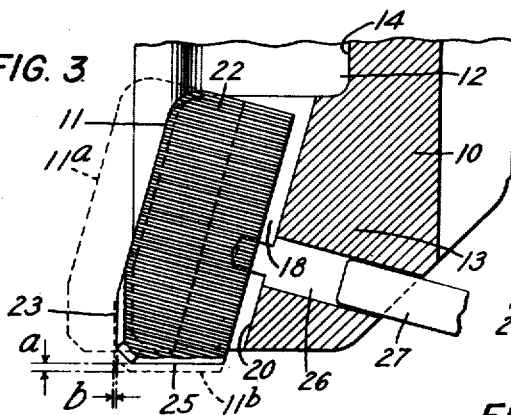
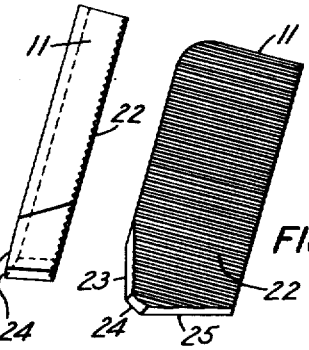
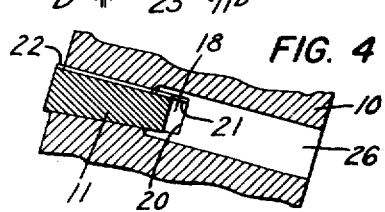
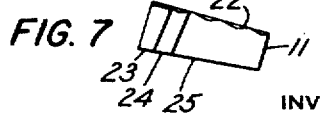
INVENTOR
Ernest Reaney
BY
Albert F. Nathan
ATTORNEY Patented Nov. 15, 1938

2,136,953

UNITED STATES PATENT OFFICE 2,136,953

FACE MILLING CUTTER

Ernest Reaney, Stratford, Conn., assignor to The O. K. Tool Company, Inc., New York, N. Y., a corporation of New York Application June 11, 1937, Serial No. 147,633

2 Claims. (Cl. 29—105)

The invention disclosed herein relates to improvements in single tapered insertable blade face milling cutters and more particularly to an improved method of obtaining a sturdy clamp for the blade in an equally sturdy body with provision for making blade adjustments in two directions simultaneously without using auxiliary wedges, shims or other clamping devices. In accordance with the present invention it is proposed to make the adjustments in ratios suited to the rates at which end and peripheral cutting edges of the face mill require adjustment to compensate for the difference in amounts lost by those two cutting edges in resharpening the cutter.

A primary aim of the invention is to render available a face milling cutter incorporating a blade clamping principle in which the danger of cracking or splitting the body, when the blades are driven in place, is effectively eliminated. The invention further aims for a construction in which a relatively large number of insertable blades may be used, each of which may be firmly and solidly clamped in position, without causing undue flexing of the body such as would create unbalanced stresses and render the body liable to relatively easy fracture under operating conditions.

In furthering the above ends the invention also aims to provide a means for dislodging the blades, when necessary for adjustment purposes, which does not weaken the slotted body member and by the aid of which the individual blades may be easily removed without danger of cracking a blade during the removing operation.

Another aim of the invention is to obtain a double adjustment of the blade in a simple and effective manner without resort to auxiliary devices such as shims, adjusting blocks, screws, or other locking devices. In attaining this objective, the invention proposes a structure in which the insertable blades are given a taper in one direction only, and a corresponding single taper given to the slots in the body member, arranged in a definite manner that yields a compound adjustment of the blade in the direction of both of its cutting edges, in a single operation.

In prior designs, an auxiliary shim or wedge piece, for example, was necessary in order to obtain an adjustment in one direction and serrations used to obtain the adjustment in the other direction. The adjustments obtained are, so to speak, independently effected, that is, an adjustment in one direction could be obtained with or without an adjustment in the other direction. The net result, however, was that the adjustment was effected in steps.

The use of shims, spacers, etc., were also unsatisfactory for the reason that the mechanic would seldom if ever have the proper thickness of shim available, and makeshifts were resorted to which resulted in a needless waste of blade material in regrinding. Moreover, in every case where auxiliary members were employed in clamping or to obtain an adjustment the requisite rigidity in blade mounting essential in tools of this character was never attained.

The present invention aims to eliminate the disadvantages existing in the prior devices heretofore resorted to, by a construction in which the single taper on the blade affords the sole means for clamping it in position, and which taper extends in a direction biasing the direction of extent of both of the cutting edges. The respective tapered slots in the cutter body member are likewise cut on an angle which biases the axis of rotation, and as the blades are adjusted laterally in the slots one or more serrations, they are caused to advance on a biasing angle. The ratio between the radial and axial adjustment is governed, in accordance with the present invention, by the relation between the spacing of the serrations and the plane of their incline and which factors are determined beforehand and depend upon the rates of relative adjustments desired in radial and axial directions.

In carrying out the objectives of the invention, it is proposed to construct a body member in the form of a relatively thick disc and to recess the front face of the disc a substantial distance inwardly forming a relatively massive annular flange or rim on the body. The recessed portion of the body and the back thereof is suitably bored and slotted to fit the conventional spindle. The front end face of the rim portion is further inwardly reduced to a shape similar to the inside of a flattened cone and the inclined end of the rim thereafter slotted to provide blade receiving sockets. The slots extend in a generally radial direction but at an angle to a plane perpendicular to the axis so that the general plane of the blade slots is at an angle biasing the axis of the cutter and said perpendicular plane. The outer periphery of the body, accordingly, is opened only about ¼ or ⅓ of its axial length thus leaving the major portion of the periphery completely closed for reasons that will be made apparent hereafter.

The blade slots are provided with tapered side walls which converge inwardly toward the bottoms of the slots and the general plane of the taper is also at an angle to the axis and the perpendicular plane. Similarly tapered blades are adapted to be inserted in the openings in the rim of the body, each of which is provided with a series of parallel serrations on one face adapted to interfit with a similar series of serrations in the adjacent wall of the body.

In assembling the cutter, the blades are dropped into the slots and successively tapped until all are firmly clamped or wedged into position. By reason of the closed periphery of the body, the driving of the tapered blades in position does not tend to split the body or place it under an undue or unbalanced stress, such as would promote fracture when subjected to a tooling force. By having the outer periphery of the cutter body completely closed and solid substantially its whole length, the flexing thereof incident to driving the wedges in position is so materially reduced that the error in the final position of the last blade of a thirty bladed cutter is about .008" as compared with .062" in a cutter of the prior designs. Thereafter, the cutter is mounted on an indexible holder and the outer ends and forward corner of each blade ground to the proper size and shape for the particular operation.

As the cutting edges of the assembled cutter wear the blades may again be moved out to size by dislodging them from their sockets and advancing each blade one or more serrations as may be required to increase the outside diameter and end face of the cutter the proper amount. The adjustment effected, it will be observed, is a compound adjustment in two directions, that is, axially of the body and simultaneously radially, and the ratio between the end and radial adjustment is a function of the spacing of the serrations and the angle of incline of the tapered slots.

For example, if the spacing of the serrations approximate .06" and the angle of the slots 15°, the amount the face of the blade advances for each serration or movement is .015". On the other hand, if the angle of incline of the slots is 20°, the advance or increase on the face of the cutter is .020". Under the same conditions the blade also will advance outwardly in a radial direction .058" for a 15° angle of incline, and .056" for a 20°. Thus, by so relating the angle of incline with the spacing of the serrations, the ratio between the radial and endwise movement of the blades may be controlled to suit the particular wearing conditions expected to be encountered by the cutter.

With a blade structure of the character explained, which relies solely upon its own shape for the entire clamping action, means must be provided for removing the blades that will not in itself weaken the body member nor introduce the danger of cracking the blade during the blade removing operation. Those ends are achieved in the present invention by providing a hole in the body at the rear of each blade through which a drive pin may be inserted to apply a force centrally on the blade.

So as not to weaken the rim of the cutter body, for reasons above explained, the knock-out holes extend generally axially from a point midway between the ends of the blade slots, through the body to the rear thereof, thus leaving the outer periphery of the body intact and completely closed as before. This construction, it will be further observed, enables the mechanic to use a large drive pin that will not mushroom in the hole and become jammed or broken and at the same time eliminates the necessity of cutting the slots any deeper than necessary to accommodate the blades. This construction has the further advantage that a centralized pressure may be exerted at the underside of each blade whereby the blade may be moved relatively easily without danger of cracking.

In some constructions wherein the blade is dislodged by inserting a wedge under the blade, the dislodging force is applied at one extreme end and which is not practical with the newer alloy steels because of the danger of cracking. Moreover, such constructions require that the body member be slotted a considerable distance more than is necessary for the blade in order to accommodate a substantial wedge piece or drift pin that will not break or become jammed in the slot. And as the large slots materially weakened the body, such blade removing expedients have not proved satisfactory.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, a drawing depicting a preferred typical construction has been annexed as a part of this disclosure and, in such drawing, like characters of reference denote corresponding parts throughout all the views, of which:—

Figure 1 is an end view of a face mill embodying the present invention.

Fig. 2 is a side view thereof partly in section.

Fig. 3 is an enlarged sectional view illustrating features of the assembly and adjustability of the blade.

Fig. 4 is a projected end sectional view of a blade in clamped position.

Figs. 5, 6, and 7 are projected detail views of the blade.

Referring more particularly to Figs. 1 and 2, the invention is disclosed embodied in a milling cutter of the face mill type. The body member 10 is constructed of relatively soft but strong tough material whereas the blades 11 may be made of the extremely hard newer alloy metals which experience has shown to be quite brittle when subjected to a sharp blow.

The body 10 is made relatively thick in an axial direction and is recessed at its front face or end as at 12, to provide a heavy external rim 13 on the body. The bottom of the recess 12 is bored and the rear face slotted in accordance with standard practice to fit a spindle by means of which the cutter is driven.

The forward end face of the rim 13 is relieved from a line 15 near the outer edge inwardly and rearwardly to form a convex or cone-shaped surface 16 and a flat annular surface 17 at the outer edge of the rim. In cross-section the cutter body is generally U-shaped, and through the top of the upstanding leg portions of the U, tapered slots 18 are formed for receiving the blades.

The slots 18 are inclined with respect to a radial line, to afford the required rake angle 19 in front of each tooth, and in a transverse direction substantially parallel to the inclined end surface 16 of the body. The blade slots are also tapered in a direction perpendicular to the end surface 16. By recessing the center portion of the cutter body to a point substantially below the depth of the blade slots, and by forming the slots through the outer end portions of the rim, the cutter used in milling the slots may pass clear through the rim without danger of cutting into the back wall 14 of the body. The blade slots do not, therefore, require any broaching operations and may with a formed cutter be produced in a single pass. The bottom wall 20 of the slots will, therefore, be inclined with respect to the plane perpendicular to the axis and emerge from the body at its periphery and quite near the forward end thereof. The major portion of the peripheral surface of the body in an axial direction, remains completely closed and in one solid continuous piece. To achieve the best results, the blade slots should not be appreciably deeper than the width of the blade and should not extend more than ¼ or ⅓ of the axial length of the periphery.

The rear supporting wall of each blade slot is provided with a series of serrations 21, which in the present embodiment of the invention extend in a direction substantially perpendicular to the incline of the end face 16 of the body.

Each of the blade members that fit within the slots of the body consists of elongated rectangular elements, the side surfaces of which incline toward each other in a direction crosswise its length and has provided on one side a series of serrations 22 adapted to interfit with the serrations 21 in the body. Blades of this character (rectangular) may be inexpensively manufactured and as they require but a single taper they may be produced in quantity lots at a minimum of expense. The serrations 22, inasmuch as they also extend in the direction of the taper, i. e., crosswise the blade, the forming of the serrations upon the blades does not require an expensive or complicated set-up.

In assembling the blades in the body, each blade is dropped into its slot and the blades successively and repeatedly tapped until all are firmly wedged in position. In the embodiment of the invention disclosed, it has been found that the driving home of the respective blades does not result in any material unevenness in the final positions of the first and last blades and the amount of blade material that must be ground away to true up the cutter is comparatively slight.

In prior structures wherein the blade slots extend through the periphery of the body, the driving-in of the respective blades caused a flexing of the body to such a degree that the next preceding blade slot is appreciably reduced. In consequence, the blades cannot be inserted to substantially the same relative positions and considerable grinding and waste of blade material is necessary to true the cutter.

After the rectangular blades are all in position in the body, the cutting edges 23, 24, and 25, may be formed thereon. By virtue of the incline of the blade and blade slot, the end cutting edge 23 extends only a short distance inwardly from the outer corner. However, in face milling tools, a relatively short cutting edge 23 is all that is required because the largest part of the cutting is done by the edges 24 and 25 of the blades.

Once the blades have been wedged in position, the forces of the tooling operation coact to maintain the blades firmly clamped, and the cutting pressures may become so great that it is only with considerable difficulty that the blades may be removed from the body. In the present embodiment, where the blades extend close to, but do not touch a bottom wall 20 of the slots, thin wedge pieces cannot be driven therein to dislodge the blade because small wedges or drift pins lack sufficient strength and will break or jam in the space behind the blade. In order to acquire strength and rigidity it is not feasible to enlarge the blade slot 20 to accommodate a larger drift pin, for that would mean weakening the body of the holder particularly at its periphery where the maximum strength is required. Moreover, experience has shown that wedges and drift pin devices not only tend to bind in the slot beneath the blade, but the continued hammering imposes a twisting force only at the outermost corner of the blade which frequently results in a split or a cracked blade, particularly in cutters using cemented carbide or other brittle materials for blades.

This invention proposes a construction avoiding the above mentioned difficulties in which a driving force may be imposed directly upon the blade in a direction paralleling the serrations and the taper, whereby the blade may be removed without danger of fracture. Figs. 2 and 3 of the drawing illustrate how blade removal may safely be accomplished without sacrificing strength. The present method consists in providing an aperture 26 at the rear of each blade slot midway between its ends, and extending the aperture through the rear wall of the body. In this construction the hole 26 is in alignment with the serrations 22 which in turn follows the taper on the blade, hence there is no danger of imposing an unbalanced force upon the blade. In actual operation the drive pin 27 will be used which is slightly less than the size of the hole 26 so as to be guided thereby for blade removing operation.

Fig. 3 of the drawing illustrates in dotted lines 11ᵃ the position of the blade as it is being inserted or removed. In the same figure, the dotted lines 11ᵇ illustrate a readjusted position of the blade in order to compensate for wear and regrinding operations and to restore the cutter to its original size. The distance marked $a$ indicates the increase in the diameter of the cutter. The distance $b$, the increase in the face, which distances may as above mentioned, be altered in a compensatory manner to suit the rates of wear on the cutting edges 23 and 25 respectively.

Normally, the greatest wear on the cutting edges will be along the edges 24 and 25, whereas, the wear on edge 23 is relatively slight. It is important, therefore, that the relation between the movements $a$ and $b$, be such that major adjustments occur in the diameter, and only slight adjustments on the end or face. It has been found, however, that by using a 15° angle of incline for a blade serrated slightly finer than sixteen serrations per inch, the advance of the cutting edge on the face is .015″ per serration of movement as compared with an advance of .058″ of the cutting edge 25 on the radius. These amounts of adjustment are ample for regrinding the peripheral cutting edges of the blades and for dressing up the face or radial cutting edges. However, if a 20° angle of incline is used, the adjustment on the face is .020″ as compared with the adjustment of .056″ on the radius. In this manner the ratios between the end and side adjustments may be varied to suit the character of work to be performed and substantial savings in blade material effected by reason of the fact relatively narrow blades may be used.

As illustrated in the drawing, the blades are considerably longer than they are wide and as the greatest wear takes place in the direction of their length, narrow blade stock may be used.

This construction has the further advantage that at all times there is no substantial overhang of the blade from the body, and practically the entire blade is firmly wedged and supported throughout its surface area between the walls of the slots 18, and this result endures throughout the life of any given blade. For example, as the blade is adjusted outwardly in the direction of the incline wall 20, the inner portions of the blade are at all times supported over substantially their entire remaining area in the body member. That is to say, there is no decreasing in the effectiveness of the clamp as the blade is foreshortened during use as it is occasioned in certain prior art structures in which an auxiliary wedge piece is used and adjustments effected by shifting the wedge relative to the blade.

It will also be evident from the foregoing, that adjustments of the blade in the present invention are effected in two directions simultaneously without the use of shims or other expedients, which promote vibration and result in inferior work.

In face milling operations the chips removed between teeth during the cut have a tendency to work toward the center of the cutter, and by providing the substantial recess 12 in the body member, and by inclining the inserted teeth rearwardly at their inner ends, the center working chips are permitted to fall into a relatively large clearance space within the body of the cutter almost immediately, and there is no scoring of the workpiece by reason of the chips becoming jammed between the cutter and the work.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. An insertable blade face mill comprising a body member provided with an annular rim closed along its periphery substantially its full axial length, said rim defining an inner clearance space for chips and cutter run out space, said rim also having its end face inwardly dished at an angle of approximately 20° and provided with a plurality of tapered blade slots extending substantially radially, the said tapered slots also being inclined in a direction substantially parallel to the dished end face of said rim; and having their front and rear walls parallel in said direction single tapered blade members in said slots and maintained by the taper in spaced relation with the bottom walls thereof, each of said blades being relatively long and narrow and the taper thereon extending in the direction of the narrow dimension; complemental interfitting serrations formed upon one surface of each blade and upon the adjacent surface of each blade slot, said serrations likewise extending in the direction of the blade taper whereby adjustment of the blade one or more serrations outwardly simultaneously increases the end and peripheral cutting edges in a ratio of approximately 1 to 6, the respective blades being held in place solely by the wedging action of their single taper; and means provided by the body for exerting a force in a direction coincident with the direction of taper centrally of the blade for dislodging it from its socket.

2. An insertable blade milling cutter comprising a body member provided with an integral annulus portion closed along its periphery substantially its full axial length, said annulus having its end face inwardly sloped and provided with a plurality of radial blade slots extending in a direction of said slope, the said slots having their front and rear walls parallel in a radial direction and being single tapered in a direction perpendicular to said end face; single tapered blade members in said slots, each of said blades being relatively long and narrow and the taper thereon extending in the direction of the narrow dimension; complemental interfitting serrations formed upon opposed surfaces of each blade and blade slot, said serrations likewise extending crosswise the blades whereby adjustment of the blade one or more serrations radially outwardly increases simultaneously the face cutting edge in accordance with the formula X serrations times sine of the angle of said slope, and the peripheral cutting edge in accordance with the formula X serrations times the cosine of the angle of said slope, where X equals the spacing of said serrations, said blades being held firmly in position solely by the wedging action of the single taper.

ERNEST REANEY.

CERTIFICATE OF CORRECTION.

Patent No. 2,136,953. November 15, 1938.

ERNEST REANEY.

It is hereby certified that error appears in the printed specification of the above numbered patent requiring correction as follows: Page 4, second column, line 42, claim 2, for the word "opposed" read apposed; and that the said Letters Patent should be read with this correction therein that the same may conform to the record of the case in the Patent Office.

Signed and sealed this 20th day of December, A. D. 1938.

(Seal)

Henry Van Arsdale
Acting Commissioner of Patents.

the greatest wear takes place in the direction of their length, narrow blade stock may be used.

This construction has the further advantage that at all times there is no substantial overhang of the blade from the body, and practically the entire blade is firmly wedged and supported throughout its surface area between the walls of the slots 18, and this result endures throughout the life of any given blade. For example, as the blade is adjusted outwardly in the direction of the incline wall 20, the inner portions of the blade are at all times supported over substantially their entire remaining area in the body member. That is to say, there is no decreasing in the effectiveness of the clamp as the blade is foreshortened during use as it is occasioned in certain prior art structures in which an auxiliary wedge piece is used and adjustments effected by shifting the wedge relative to the blade.

It will also be evident from the foregoing, that adjustments of the blade in the present invention are effected in two directions simultaneously without the use of shims or other expedients, which promote vibration and result in inferior work.

In face milling operations the chips removed between teeth during the cut have a tendency to work toward the center of the cutter, and by providing the substantial recess 12 in the body member, and by inclining the inserted teeth rearwardly at their inner ends, the center working chips are permitted to fall into a relatively large clearance space within the body of the cutter almost immediately, and there is no scoring of the workpiece by reason of the chips becoming jammed between the cutter and the work.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. An insertable blade face mill comprising a body member provided with an annular rim closed along its periphery substantially its full axial length, said rim defining an inner clearance space for chips and cutter run out space, said rim also having its end face inwardly dished at an angle of approximately 20° and provided with a plurality of tapered blade slots extending substantially radially, the said tapered slots also being inclined in a direction substantially parallel to the dished end face of said rim; and having their front and rear walls parallel in said direction single tapered blade members in said slots and maintained by the taper in spaced relation with the bottom walls thereof, each of said blades being relatively long and narrow and the taper thereon extending in the direction of the narrow dimension; complemental interfitting serrations formed upon one surface of each blade and upon the adjacent surface of each blade slot, said serrations likewise extending in the direction of the blade taper whereby adjustment of the blade one or more serrations outwardly simultaneously increases the end and peripheral cutting edges in a ratio of approximately 1 to 6, the respective blades being held in place solely by the wedging action of their single taper; and means provided by the body for exerting a force in a direction coincident with the direction of taper centrally of the blade for dislodging it from its socket.

2. An insertable blade milling cutter comprising a body member provided with an integral annulus portion closed along its periphery substantially its full axial length, said annulus having its end face inwardly sloped and provided with a plurality of radial blade slots extending in a direction of said slope, the said slots having their front and rear walls parallel in a radial direction and being single tapered in a direction perpendicular to said end face; single tapered blade members in said slots, each of said blades being relatively long and narrow and the taper thereon extending in the direction of the narrow dimension; complemental interfitting serrations formed upon opposed surfaces of each blade and blade slot, said serrations likewise extending crosswise the blades whereby adjustment of the blade one or more serrations radially outwardly increases simultaneously the face cutting edge in accordance with the formula X serrations times sine of the angle of said slope, and the peripheral cutting edge in accordance with the formula X serrations times the cosine of the angle of said slope, where X equals the spacing of said serrations, said blades being held firmly in position solely by the wedging action of the single taper.

ERNEST REANEY.

CERTIFICATE OF CORRECTION.

Patent No. 2,136,953. November 15, 1938.

ERNEST REANEY.

It is hereby certified that error appears in the printed specification of the above numbered patent requiring correction as follows: Page 4, second column, line 42, claim 2, for the word "opposed" read apposed; and that the said Letters Patent should be read with this correction therein that the same may conform to the record of the case in the Patent Office.

Signed and sealed this 20th day of December, A. D. 1938.

(Seal)

Henry Van Arsdale
Acting Commissioner of Patents.